United States Patent [19]

Brunet

[11] Patent Number: 4,577,784

[45] Date of Patent: Mar. 25, 1986

[54] VALVE FOR DISPENSING A MEASURED VOLUME OF FLUID FROM A CONTAINER CONTAINING A FLUID SUBSTANCE UNDER PRESSURE

[75] Inventor: Michel Brunet, Sainte Colombe La Commanderie, France

[73] Assignee: Etablissements Valois, Le Neubourg, France

[21] Appl. No.: 691,816

[22] Filed: Jan. 16, 1985

[30] Foreign Application Priority Data

Feb. 10, 1984 [FR] France ............................ 84 02045

[51] Int. Cl.⁴ ............................................. B65D 83/14
[52] U.S. Cl. .................................. 222/402.2; 222/389; 239/340; 239/350
[58] Field of Search ................. 222/402.2, 309, 402.24, 222/387, 336, 335, 389; 239/337, 340, 350

[56] References Cited

U.S. PATENT DOCUMENTS

| 3,018,928 | 1/1962 | Meshberg | 222/335 |
| 3,180,535 | 4/1965 | Ward | 239/337 X |
| 3,221,946 | 12/1965 | Riley | 239/350 X |

FOREIGN PATENT DOCUMENTS 1287373 11/1960 France .
1461685 10/1965 France .
1503684 10/1966 France .
2300950 2/1975 France .

*Primary Examiner*—F. J. Bartuska
*Assistant Examiner*—Edward S. Ammeen
*Attorney, Agent, or Firm*—Sughrue, Mion, Zinn, Macpeak and Seas

[57] ABSTRACT

The valve has a variable volume chamber (11) of annular section between an outer tubular body (1) and a coaxial member (4). An annular piston (5) is free to move axially to vary the volume of the chamber under the combined forces of a return spring (6) and the pressure in the container. A controllable plunger (7) is subject to the force of a return spring (8) and to control force from a user. In the rest position the plunger leaves the variable volume chamber in communication with the interior of the container, and thus with the substance to be dispensed. When pressed against its return spring (8), the plunger isolates the variable volume chamber from the interior of the container and puts the variable volume chamber in communication with the outside. A pressure difference thus appears across the piston (5) and the piston moves along the variable chamber against the force of its return spring (6) to dispense a measured volume of substance. When the plunger (7) is released, the inside pressure of the container is again applied to both faces of the piston (5), allowing the return spring (6) to refill the variable volume chamber (11) with a further volume of substance to be dispensed.

4 Claims, 2 Drawing Figures

VALVE FOR DISPENSING A MEASURED VOLUME OF FLUID FROM A CONTAINER CONTAINING A FLUID SUBSTANCE UNDER PRESSURE

FIELD OF THE INVENTION

The invention relates to a valve for dispensing a measured volume of a fluid from a container containing a fluid substance under pressure, the valve comprising a variable volume chamber constituted by a rigid body in which a piston subjected to the pressure in the container is free to move against the force of a piston return spring, the valve further comprising a plunger subjected to the action of a plunger return spring and capable of controlled movements to put the variable volume chamber into communication with the substance, or else, after interrupting said communication, to put the variable volume chamber into communication with the outside, the piston subjected to the action of the fluid pressure then being displaced to reduce the volume of the variable volume chamber and thus expel a certain quantity of the substance under pressure, said quantity constituting the desired measured volume, and the piston returning to its rest position once communication is reestablished between the variable volume chamber and the fluid under pressure by operation of the plunger.

BACKGROUND OF THE INVENTION

Various devices of this type are known, in particular those described in U.S. Pat. No. 3,018,928 (P. Meshberg, Jan. 30, 1962) and in French Pat. Nos. 1 416 685 and 1 503 684 (Idées, Oct. 29, 1965 and Oct. 10, 1966) and 2 300 950 (Valois, Feb. 12, 1975). These devices suffer from the drawbacks firstly of being rather complicated, and consequently expensive and unreliable, and secondly of being rather bulky and thus difficult to integrate into containers having a small opening.

SUMMARY OF THE INVENTION

The present invention provides a measuring valve of the above type including the improvement wherein the said rigid body is a tubular body containing a plunger-receiving chamber and a central tube coaxial with the said tubular body, the plunger-receiving chamber being located at a substance-dispensing end of the tubular body and being connected to one end of the central tube whose other end opens out at the opposite end of the tubular body, said variable volume chamber being generally annular in section and extending inside the tubular body and outside the central tube and the plunger-receiving chamber, and the piston being an annular piston mounted to move axially in said variable volume chamber, said variable volume chamber being connectable to the interior of the container via the plunger-receiving chamber and the central tube under the control of the plunger.

BRIEF DESCRIPTION OF THE DRAWINGS

An embodiment of the invention is described by way of example with reference to accompanying drawings, in which.

MORE DETAILED DESCRIPTION

Figure 1:
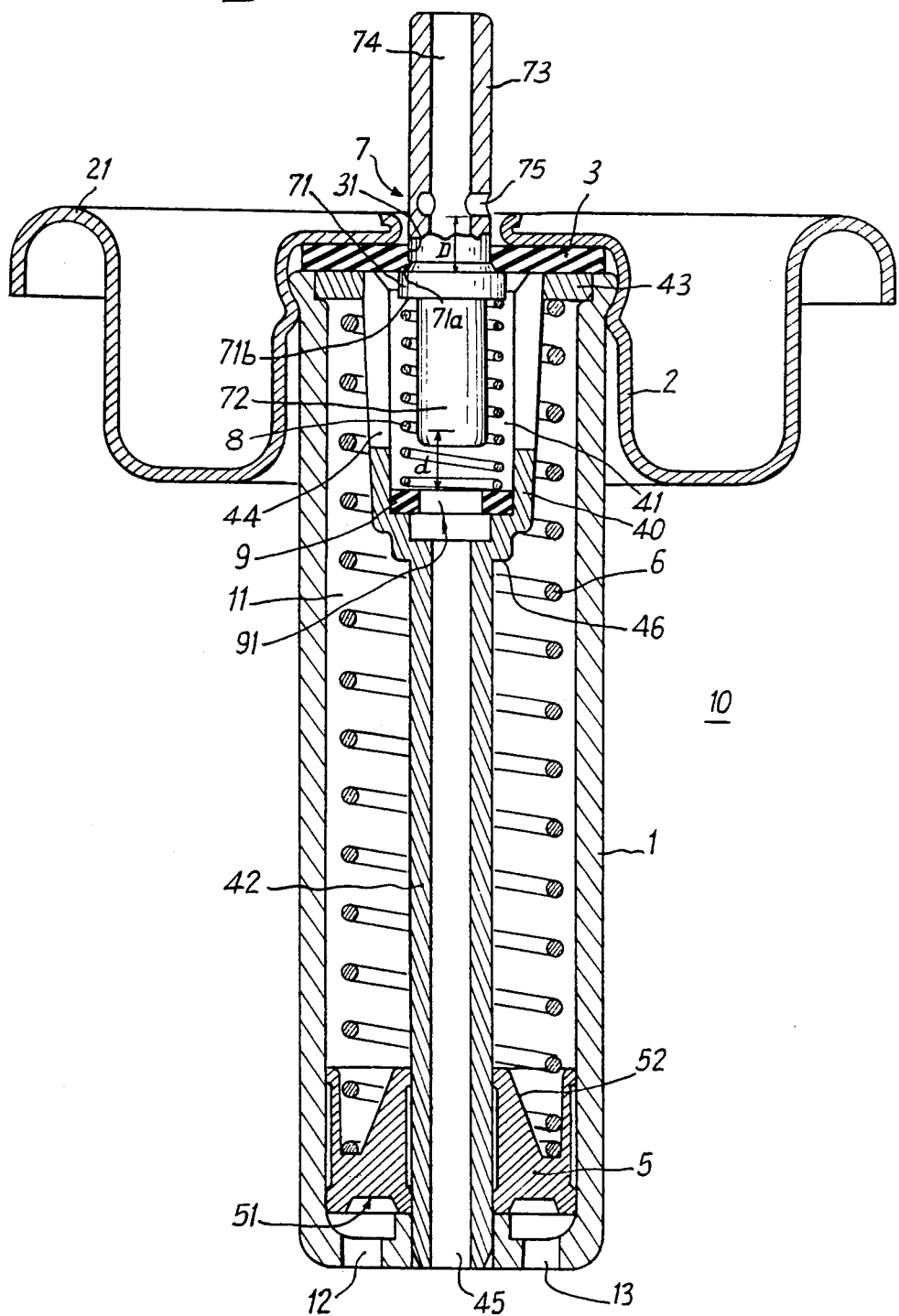
FIG. 1 is an axial section through an embodiment of a valve in accordance with the invention, and in the rest position.

The valve is shown suitable for mounting on a can having an opening in its top and generally having the configuration of a conventional pressurized aerosol can. The terms "up" and "down", "top" and "bottom", etc. are thus used in the following description with reference to the orientation shown in the figures, which is conventional for such cans in use. However, it is be observed that such valves may be designed for use while in the "upsidedown" position at the bottom of the can, i.e. with the can above the valve.

The valve shown has a tubular body 1 which is crimped in conventional manner in a cup 2 and against a sealing ring 3. The periphery of the cup is folded over for crimping in conventional manner to the top rim of a container such as a can or a bottle or the like (not shown) together with a suitable sealing ring. Reference 10 indicates the interior of the container. In normal use, this interior contains a liquid substance kept under pressure by a compressed gas which may optionally be soluble in the liquid.

A generally funnel-shaped axial member 4 (see FIG. 2) is housed in the tubular body 1 and extends from end to end therein. The top portion 40 of the axial member 4 is flared and delimits a plunger-receiving chamber 41 and the bottom portion of the member 4 is constituted by a tube 42 extending to the bottom of the tubular body 1 and having an opening 45 in the bottom face of the body 11. The top portion 40 ends with a flange 43 which is clamped between the sealing ring 3 and a shoulder at the top end of the tubular body 1 by the crimping between the cup 2 and the tubular body 1. Other suitable fixing methods could be used instead.

The wall 40 of the plunger-receiving chamber 41 includes openings 44 establishing communication between the interior of the top portion of the member 4 and the annular volume between the tubular body 1 and the member 4.

An annular piston 5 is slidably mounted in this annular volume and is urged to the bottom of the body 1 by a return spring 6 whose top end bears against the flange 43 on the member 4. The piston 5 in conjunction with the axial member 4 and the tubular body 1 determines a variable volume chamber 11. The bottom of the tubular body 1 includes at least one opening, and preferably a plurality of openings 12, 13 distributed around its circumference. These openings serve to put the interior 10 of the container into commmunication with the annular volume under the piston 5 so that the pressure in the container is applied against the bottom face 51 of the piston.

The sealing ring 3 has a central opening 31 through which there passes an outwardly extending rod portion 73 of a plunger 7. Underneath the ring 3 and inside the plunger-receiving chamber 41, the plunger 7 has a collar 71 constituting an upwardly facing bearing surface 71a and a downwardly facing bearing surface 71b. A plunger return spring 8 bears against the downwardly facing bearing surface 71b and urges the plunger 7 upwardly. The plunger 7 is maintained in its rest position by the upwardly facing bearing surface 71a being applied against the inside edge of the sealing ring 3 around its central opening 31. The other end of the spring 8 bears against the bottom of the chamber 41 via a sealing ring 9. The bottom portion of the plunger 7 is in the form of a cylindrical body 72 whose outside diameter is equal to the inside diameter of the opening 91 in the sealing ring 9. In the rest position as shown in FIG. 1, the opening 91 in the ring 9 is unblocked. The plunger-receiving chamber 41 is thus in communication with the inside of the tube 42, and thus with the interior 10 of the container. The pressure inside the container is thus applied to both faces of the piston 5. In the rest position shown in FIG. 1 the piston 5 is thus thrust against the bottom of the tubular body 1 by the spring 6.

The plunger rod 73 has a central channel 74 which is open to the top and which extends down to a point close to, and preferably just above, the collar 71. A hole 75 through the wall of the hollow rod 73 establishes communication between the channel 74 and the outside. The bottom rim of the hole 75 is at a distance D from the upwardly facing bearing surface 71a, which distance is greater than the distance d between the bottom of the cylindrical body 72 and the top of the ring 9, in such a manner as to ensure that when the plunger 7 is pressed down against the force of the return spring 8, the body 72 closes the opening 91 in the ring 9 before the bottom of the hole 75 appears inside the chamber 41 below the ring 3. This principle is known per se and is described, for example, in French Pat. No. 1 287 373 (Lucien Guillou, Nov. 22, 1960).

The funnel shape of the member 4 is advantageous since the top thereof must receive the plunger body 72, the return spring 8 and the sealing ring 9, whereas the tube 42 is preferably fairly small. However, the member 4 could be entirely cylindrical, provided that it includes means suitable for retaining the sealing ring 9 and the spring 8 (e.g. a circlip, or a step in its inside wall).

The valve operates as follows. In the rest position as shown in FIG. 1, the inside pressure of the container is applied both to the bottom face 51 of the piston 5 via the openings 12 and 13, and to the top face 52 of the piston, via the opening 45 to the tube 42, the unblocked opening 91 of the sealing ring 9, the plunger-receiving chamber 41, the openings 44 and the annular space between the tubular body 1 and the tube 42. The piston thus remains pressed against the bottom of the tubular body 1 under the effect of the spring 6.

When the plunger 7 is pressed down, the bottom end of the cylindrical body 72 closes the opening 91 in the sealing ring 9, and then the hole 75 appears in the valve chamber 41. The inside pressure of the container is then no longer applied to the top face 52 of the piston 5 since the sealing ring 9 is closed. However, the annular volume 11 above the piston is in communication with the atmosphere via the openings 44 and the hole 75 now open to the plunger-receiving chamber 41. The inside pressure acting on the bottom face 51 of the piston 5 via the openings 12, 13 thus pushes the piston against the force of the spring 6 thus expelling the contents of the variable volume chamber 11 via the hole 75 and the channel 74. The piston stops when it abuts against the shoulder 46 on the member 4. The device is then in the position shown in FIG. 2. It remains in this position until the plunger 7 is released and rises under the force of its return spring 8. When the plunger has returned to the position shown in FIG. 1, with its bearing surface 71a pressed against the sealing ring 3, the inside pressure is again applied to both faces of the piston 5, thus allowing the spring 6 to return the piston 5 to the bottom of the tubular body 1 and re-filling the variable volume chamber 11 via the tube 42.

The valve is intended for dispensing a liquid. It is thus necessary to make sure that it is indeed liquid which is sucked through the opening 45 into the tube 42. However, the pressure applied to the bottom face 51 of the piston may be exerted by a liquid or by a gas. Thus, the tubular body 1 may be surrounded by a deformable pocket or by a system including a piston in a metal box (not shown) filled with liquid and surrounded by gas under pressure inside the container. In such an arrangement, the substance dispensed is not in contact with the propellant. The substance may thus be a cream or any other liquid which needs to be kept out of contact with air or a propellant.

In a variant, the tube 42 may be extended by a conventional dip tube in a normal can with a minimum inside pressure of 6 bars for a 60% to 70% filling of the substance to be dispensed (generally a liquid, and for use with the can in the vertical orientation shown).

Figure 2:
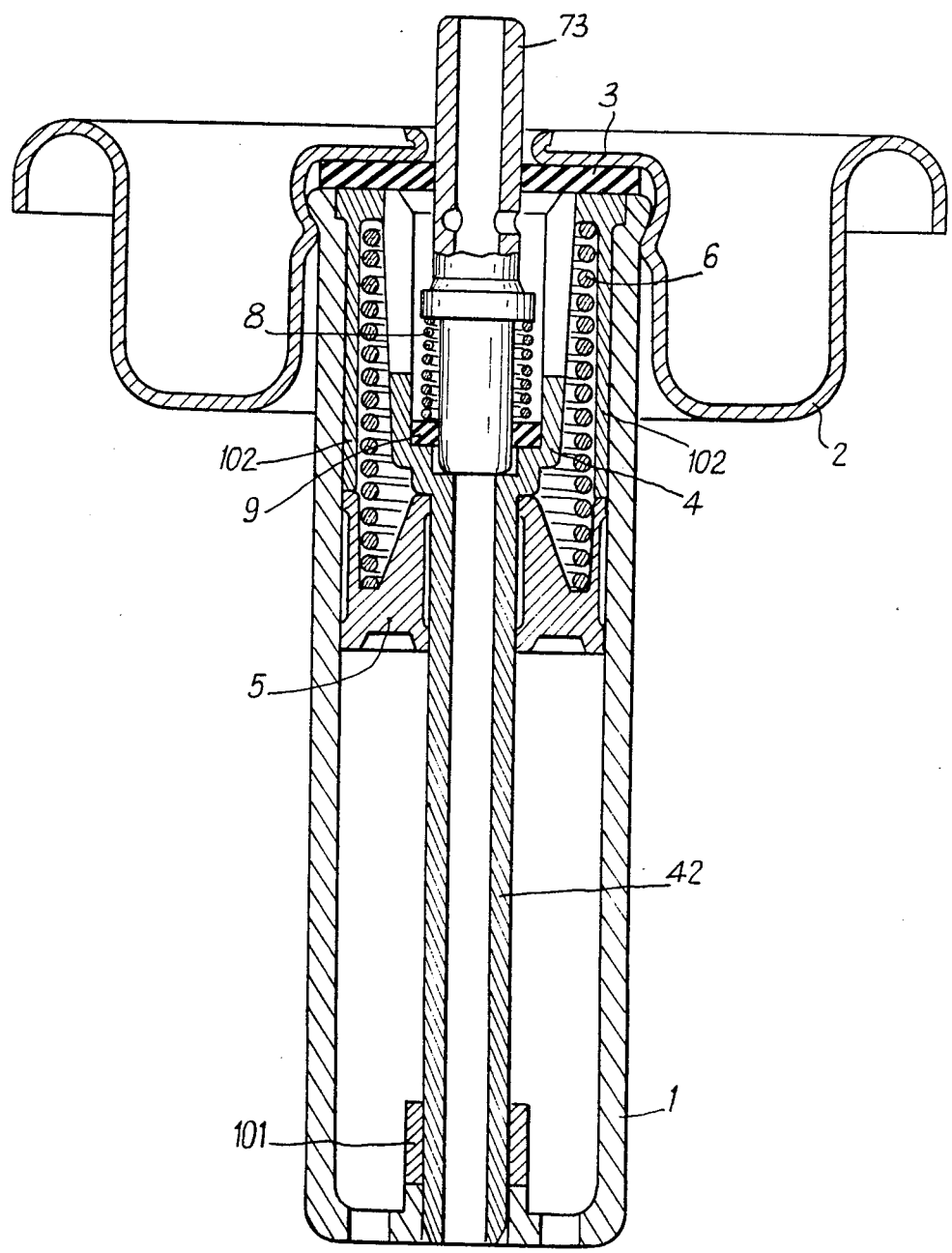
FIG. 2 is a similar view of the same valve after dispensing a measured volume.

FIG. 2 shows a tubular stop 101 placed around the tube 42 and serving to reduce the stroke of the piston 5. The stop is shown near the bottom end of the stroke, but it could alternatively be placed near the top end adjacent to the shoulder 46. As a variant, a stop could be applied against the inside wall of the tubular body 1. Whatever stop disposition is chosen, if any, the purpose is to enable substantially identical valve mechanisms to be used to dispense different volumes from different containers.

FIG. 2 also shows a tubular stop 102 projecting downwards from the flange 43 of the member 4. This stop serves to reduce the dead volume which is not swept by the piston 5. Advantageously the stop 102 is an integral part of the member 4, and constitutes a skirt whose outside diameter is equal to the inside diameter of the cylinder 1, and whose inside diameter is suitable for receiving the spring 6 with sufficient play to avoid hindering its operation. Such a skirt also has the advantage of guiding the member 4 as it is being inserted into the cylinder 1 during assembly of the valve mechanism, thus facilitating placement of the bottom end of the tube 42 in the opening provided to receive the tube in the center of the bottom of the tubular body 1.

I claim:

1. A valve for dispensing a measured volume of a fluid from a container containing a fluid substance under pressure, the valve comprising a variable volume chamber constituted by a rigid body in which a piston subjected to the pressure in the container is free to move against the force of a piston return spring, the valve further comprising a plunger subjected to the action of a plunger return spring and capable of controlled movements to put the variable volume chamber into communication with the substance, or else, after interrupting said communication, to put the variable volume chamber into communication with the outside, the valve including the improvement wherein the said rigid body is a tubular body containing a plunger-receiving chamber and a central tube coaxial with the said tubular body, the plunger-receiving chamber being located at a substance-dispensing end of the tubular body and being connected to one end of the central tube whose other end opens out at the opposite end of the tubular body, said variable volume chamber being generally annular in section and extending inside the tubular body and outside the central tube and the plunger-receiving chamber, and the piston being an annular piston mounted to move axially in said variable volume chamber, said variable volume chamber being connectable to the interior of the container via the plunger-receiving chamber and the central tube under the control of the plunger.

2. A valve according to claim 1, wherein said plunger-receiving chamber and said central tube are constituted by a generally funnel-shaped axial member including a portion of larger diameter than the tube constituting said plunger-receiving chamber, said larger diameter portion including at least one opening communicating with the said variable volume chamber.

3. A valve according to claim 2, wherein the axial member further includes a peripheral skirt which is fixed to the substance-dispensing end of the axial member, which surrounds the said plunger-receiving chamber and which has an outside diameter equal to the inside diameter of the tubular body, the inside diameter of the skirt being suitable for receiving the piston return spring with sufficient play not to hinder its operation.

4. A valve accordoing to any preceding claim, further including a cylindrical stop located in the annular space between the central tube and the tubular body to limit the stroke of the piston and thus limit the maximum volume of the said variable volume chamber.

* * * * *